Jan. 30, 1945.  W. S. DU CHARME  2,368,206

VALVE

Filed Jan. 19, 1943

INVENTOR.
William S. DuCharme
BY
Bates, Teare, & McBean
ATTORNEYS

Patented Jan. 30, 1945

2,368,206

UNITED STATES PATENT OFFICE 2,368,206

VALVE

William S. Du Charme, Lakewood, Ohio, assignor to Superior Valve Manufacturing Company, Cleveland, Ohio, a partnership consisting of George P. Haight, John H. Gornik, and William S. Du Charme Application January 19, 1943, Serial No. 472,809

14 Claims. (Cl. 251—2)

This invention relates to an improved faucet of the type generally adapted for household use and more particularly to a faucet having an improved valve mechanism. Further, the invention concerns an improved faucet valve mechanism which may be incorporated in a faucet at the time of manufacture, or which may be utilized to replace worn out valve mechanisms on existing faucets. These, therefore, are the general objects of the present invention.

A more specific object of this invention is to provide an improved faucet which will facilitate a complete shut-off of the water and thus prevent leakage.

A further object of the present invention is to provide an improved faucet valve mechanism which may be substituted for the valve mechanisms in existing faucet structures to overcome worn seats and leaky conditions with a minimum amount of alteration to the faucet structure, and without necessitating the removal of the faucet from the water line.

Another object of this invention is to provide a faucet valve mechanism which may be used for replacing worn or defective valve mechanisms in existing faucets which will require but a minimum amount of metal and yet which will have a high degree of efficiency over prolonged periods of time.

Other objects of this invention will become more apparent from the following description reference being made to a preferred embodiment of the invention illustrated in the accompanying drawing. The essential and novel features of the invention will be summarized in the claims.

Figure 1:
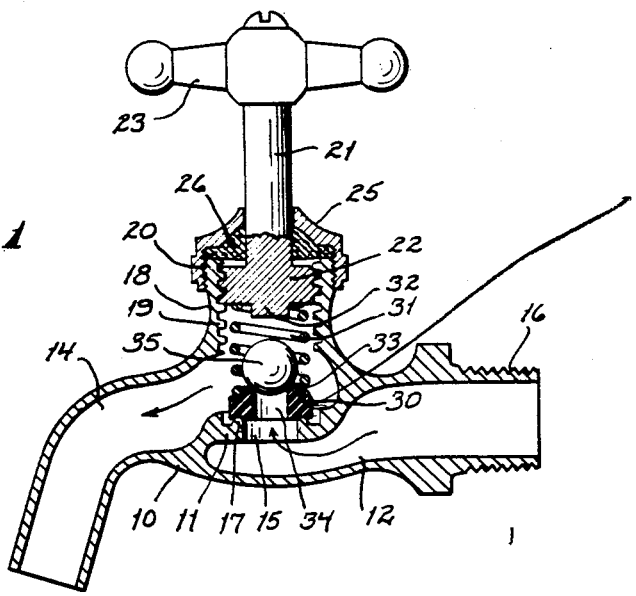
Figure 2:
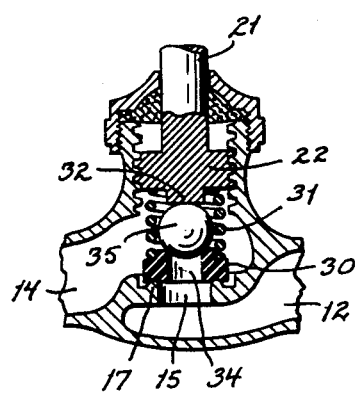
Figure 3:
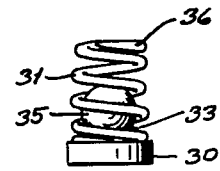
Figure 4:
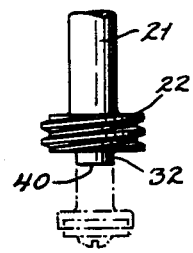

In the drawing, Fig. 1 is a vertical section through my improved faucet structure; Fig. 2 is a fragmentary view similar to Fig. 1, but illustrating the valve mechanism in a different operating position; Fig. 3 is a view of my improved valve mechanism, and Fig. 4 is an illustration of a valve operating mechanism as used with my invention and illustrating, in dotted lines, such mechanism prior to its adoption for use with the present invention.

Referring to the drawing, it will be seen that I have illustrated a faucet of the type in general household use at the present time. This faucet comprises a hollow body 10 provided with a horizontally extending partition wall 11, which divides the faucet into an inlet passageway 12 and an outlet passageway 14. Fluid flows from one passageway to the other through a valve port opening 15 in the partition wall 11. The body of the faucet is provided with means, such as threads 16, for coupling the faucet to a supply line. The flow of fluid through the valve port 15 is controlled by a valve which is operated by a stem 21. This stem extends through a hollow boss like formation 18 of the body in axial alignment with the valve port opening 15. Intermediate its ends, this stem is provided with an externally threaded enlargement 22 for engagement with internal threads 19 of the body boss 18. At its upper end, the stem 21 is provided with an operating handle 23 and the arrangement is such that, by rotating the handle, the lower end of the stem may be moved toward or from the valve port opening 15. A packing nut 25 of the usual type engages external threads 20 of the valve body boss 18, clamping a packing ring 26 between the upper end of the body boss and the nut thereby preventing escape of fluid between the valve stem and body.

The present invention is particularly concerned with an improved valve member for closing and opening the valve port 15 consequent upon the operation of the stem 21. As shown in Figs. 1 and 3, this valve member comprises an annular washer 30 of rubber or other valve sealing material. The washer is slightly larger in diameter than the diameter of the valve port 15 and is retained in seating engagement with the usual valve seat 17 by a coil spring 31. At one end, this spring abuts the threaded boss formation 22 of the valve stem, and at its other end it abuts the upper face of the valve washer 30. The spring is held in axial alignment with the valve port opening by an axial protuberance 32 of the valve stem 21 which extends into the spring, while the lower end of the spring tightly encircles a reduced portion 33 of the valve washer 30. The valve spring 31 is of such length and tension that, regardless of the position of the stem 21, sufficient pressure is always exerted on the washer 30 to maintain it in contact with the valve seat 17. The friction between the valve washer 30 and its coacting valve seat and spring is greater than the friction between the upper end of the spring and the enlargement 22 on the valve stem, and, therefore, the washer will not rotate when the stem is rotated to raise and lower the valve, thus insuring a tight fit at all times between the washer and the valve seat, regardless of inaccuracies in the seat itself.

Fluid flows from the inlet passageway 12 to the outlet passageway 14 through a central opening 34 in the valve washer 30. This flow is controlled by the position of a ball 35 which is disposed within the coil spring 31, and which is of a larger diameter than the opening 34 of the washer, and of a smaller diameter than the internal diameter of the coil spring 31. In Fig. 1, the valve is shown in an open position, wherein the ball 35 is resting upon the washer 30 by gravity. In actual operation, the faucet would, of course, be connected to a supply line and fluid pressure through the inlet passageway 12 would raise the ball from its seat. When it is desired to shut off the flow of fluid, the handle is rotated to lower the protuberance 32, Fig. 2, and force the ball into contact with the washer, thus closing the opening 34 therein.

When the valve is in its closed position, as shown in Fig. 2, the sealing washer 30 is forced into engagement with its seat, not only by the pressure of the spring 31, but also by the action of the stem 21 on the ball 35. This insures against fluid seepage either past the valve seat 17, or through the port 34 of the washer. Inasmuch as the washer is always stationary relative to the valve seat 17, as heretofore explained, seepage due to seat inaccuracies is avoided. Likewise, inasmuch as the shut-off member or sealing member comprises a sphere 35, which is freely rotatable in any direction when the faucet is open, misalignment between the sealing member and washer is avoided. It will be noted that, in my improved faucet, the sealing member 35 is never rotated relative to the washer until the sealing pressure thereon is entirely removed. This materially increases the life of the faucet.

Inasmuch as my improved faucet valve mechanism does not require a perfect condition of the valve seat 17 in the faucet body, the valve mechanism is well adapted for use in existing faucets wherein the valve seat 17 has become pitted or worn. In Fig. 4, I have illustrated, in full lines, the valve stem as used in this invention, and in dotted lines the valve stem as used in present faucet structures. Thus it will be seen that to adapt present faucet structures for the use of my improved valve mechanism, one need only to sever the lower portion of the stem as indicated by the full line 40, eliminating that portion shown enclosed in dotted lines from the structure. The length of the portion to be removed is readily determined inasmuch as the distance between the valve seat and the lower end 40 of the stem required for the operation of my valve is a predetermined distance. I anticipate that on some faucets the stem enlargement 22 may have to be shortened to provide sufficient clearance for the opening of the valve closing member 35, but this may be readily accomplished merely by removing the valve stem from the faucet and cutting it down by a suitable power driven tool.

My improved valve mechanism, namely the valve washer 30, the spring 31 and the valve member or ball 35, is preferable made as a self-contained unit. As heretofore mentioned, the lower end of the spring 31 is attached to the washer 30 and the ball is positioned within the spring. To retain the ball within the assembly whether or not the assembly is in a faucet, I reduce the uppermost coil 36 of the spring to a diameter smaller than that of the ball, as shown in Fig. 3. Accordingly, I greatly facilitate assembly of faucets and also enable the provision of a single unit for use as a replacement in existing faucet structures.

I claim:

1. In a faucet of the class described, a faucet body having an inlet passageway and an outlet passageway separated by a partition having a port extending therethrough, means to control the flow of fluid through said port comprising an annular washer of a greater external diameter than the diameter of the port, means to retain the washer in contact with the partition wall surrounding said port, means to control the flow of fluid through said port comprising a spherical member having a diameter greater than the internal diameter of said annular washer, and means to selectively force said member into contact with said washer to stop the flow of fluid therethrough, and wherein said retaining means, said washer and said spherical member are constructed and arranged to be removed as a unit from said body.

2. In a faucet of the class described, a faucet body having an inlet passageway and an outlet passageway separated by a partition having a port extending therethrough, means to control the flow of fluid through said port comprising a port covering member having an opening therethrough, means to control the flow of fluid through said opening and comprising a valve member having a diameter greater than the internal diameter of the opening, means positively engaging said valve member to selectively force said valve member into contact with said port closing member to close the opening and force said port covering member into engagement with said partition wall, retaining means to retain said port closing member in contact with said wall when said valve member moves out of engagement with said port closing member, and wherein said retaining means, said port covering member, and said valve member are constructed and arranged to be removed as a unit from said body.

3. In a faucet, a hollow body having an inlet and an outlet separated by a partition wall provided with a port, means to control the flow of fluid through said port, said means comprising a washer having an outer diameter greater than that of said port and having an opening in substantial alignment with said port, resilient means to retain said washer in contact with said partition adjacent the opening therein, and in substantial alignment with said port, a ball adapted to close the opening in said washer, positive acting means to selectively force said ball into engagement with said washer to close the opening therethrough and simultaneously increase the pressure of the washer against said partition.

4. In a faucet, a hollow body having an inlet and an outlet separated by a partition wall provided with a port, means to control the flow of fluid through said port, said means comprising a washer to close said port but having an opening therethrough smaller than said port, means to retain said washer in contact with said partition with its opening in substantial alignment with said port, a ball adapted to close the opening in said washer, positive acting means to selectively force said ball into engagement with said washer to close the opening therethrough and simultaneously increase the pressure of the washer against said partition, and wherein said washer, said retaining means and said ball are removable as a unit from said body.

5. In a faucet of the class described, a faucet body having an inlet passageway and an outlet passageway separated by a partition having a port extending therethrough, means to control the flow of fluid through said port comprising a compressible washer of a greater external diameter than the port positioned on the outlet side of said partition and in substantial alignment with said port, a coil spring to retain the washer in contact with the partition, a valve member to control the flow of fluid through said washer, and a valve stem threadingly mounted in said body to selectively force said valve member into contact with said washer to stop the flow of fluid therethrough consequent upon rotation of said stem, and to simultaneously increase the pressure of said coil spring on said washer.

6. In a faucet, a hollow body having an inlet and an outlet separated by a wall provided with a port, a washer having a diameter of greater size than that of said port and having an opening therethrough, resilient means to retain said washer in contact with said wall with its opening in substantial alignment with said port, a ball adapted to close the opening in said washer, positive acting means to selectively force said ball into engagement with said washer to close the opening therethrough and simultaneously increase the pressure of said resilient means on said washer.

7. In a faucet, a hollow body having a fluid inlet and a fluid outlet separated by a ported partition wall, means to control the flow of fluid through said port, said means comprising a washer of an external diameter greater than the diameter of said port and having an opening extending therethrough, a ball having a diameter greater than that of the opening in said washer, and adapted and arranged to close the opening, actuating means in axial alignment with said opening and movable to and from said ball to positively force said ball into contact with said washer, resilient means mounted on said washer and interposed between said actuating means and said washer to retain said washer seated on said partition, said resilient means comprising a coil spring encircling said ball and so arranged as to retain said ball within the confines of said spring.

8. In a faucet, a hollow body having a fluid inlet passageway and a fluid outlet passageway separated by a partition wall having a port communication with the passageways, means to control the flow of fluid through said port, said means comprising an annular ring having an external diameter greater than the external diameter of said port, a ball having a diameter greater than that of the internal diameter of said ring, an operating member carried by said hollow body in axial alignment with said port and ring, said member being movable into contact with said ball to positively force said ball into contact with said ring and thereby prevent the flow of fluid through said ring, a coil spring having one end mounted on said washer, the other end abutting said operating member to retain said washer seated on said partition wall, said ball being freely movable in said spring when the operating member is moved to a withdrawn position and being so restricted at its open end as to retain said ball within the confines of said spring.

9. In a faucet, a hollow body having an inlet and an outlet separated by a wall provided with a port, a washer having a diameter greater than that of said port and having an opening therethrough, a ball adapted to close the opening in said washer, turnable means to move said ball into a closing position, and means interposed between said turnable means and said washer to resiliently retain said washer in contact with said wall with its opening in substantial alignment with said port, said means and washer being arranged and adapted to permit turning of said turnable means and at the same time prevent turning of said washer.

10. In a faucet, a hollow body having an inlet and an outlet separated by a wall provided with a port, a washer positioned on the outlet side of said wall with its axis in substantial alignment with said port, said washer being larger than said port and having an axial opening extending therethrough, a ball to selectively close the opening in said washer, turnable means carried by said body in axial alignment with said port to force said ball into a closing position, a coil spring interposed between said means and said washer to retain the washer in contact with said wall, and means carried by said turnable means to retain said spring in substantial axial alignment with said port.

11. In a faucet, a hollow body having a fluid inlet and a fluid outlet separated by a partition wall having a port extending therethrough, means to control the flow of fluid through said port, said means comprising a washer of an external diameter greater than the diameter of said port and having an opening extending therethrough, a sphere having a diameter greater than that of the opening in said washer, and adapted and arranged to close such opening, rotatable actuating means in axial alignment with said opening and movable to and from said sphere to positively force said sphere into contact with said washer, resilient means mounted on said washer and interposed between said actuating means and said washer to retain said washer seated on said partition, and wherein the friction between said actuating means and said resilient means is less than the friction between said washer and either said resilient means or said wall, whereby said washer remains stationary regardless of the rotation of said operating means.

12. A valve mechanism for a faucet, comprising a coil spring, an annular ring mounted in one end of said coil, a ball within said coil having a diameter greater than the internal diameter of said ring and smaller than the internal diameter of said coil, and means to retain the ball within said coil.

13. A valve mechanism for a faucet comprising a coil spring having a restricted diameter at one end thereof, a washer having an opening therein carried by the other end of said spring, and a ball within said spring to close the opening in said washer, the diameter of said ball being greater than the internal diameter of either the open end of said spring or the opening in said washer.

14. A self-contained valve mechanism for a faucet or the like, comprising an annular member of resilient material and having an axial opening extending therethrough, one end of said member having a reduced diameter providing a shoulder extending normal to the axis of the member, a coil spring carried by said reduced portion and having one end abutting said shoulder, said spring extending upwardly above the upper face of said member and having its uppermost coil restricted in diameter, and a sphere within said spring of a diameter greater than the internal diameters of the open end thereof or the opening in said member and movable axially into and out of position to close said opening.

WILLIAM S. DU CHARME.